Dec. 22, 1970 L. R. HALSTED 3,550,003
BINARY DATA TRANSMISSION SYSTEM USING "FUTURE", "PRESENT" AND "PAST" BITS FOR REFERENCE SYNCHRONIZATION
Filed Oct. 17, 1966 4 Sheets-Sheet 1

INVENTOR.
LEONARD R. HALSTED
BY Arthur Frelich
ATTORNEYS

Dec. 22, 1970 L. R. HALSTED 3,550,003

BINARY DATA TRANSMISSION SYSTEM USING "FUTURE", "PRESENT" AND "PAST" BITS FOR REFERENCE SYNCHRONIZATION

Filed Oct. 17, 1966 4 Sheets-Sheet 2

INVENTOR.
LEONARD R. HALSTED

BY Arthur Frailich

ATTORNEYS

INVENTOR.
LEONARD R. HALSTED
BY Arthur Frielich
ATTORNEYS

INVENTOR.
LEONARD R. HALSTED
BY
Arthur Freilich
ATTORNEYS

United States Patent Office 3,550,003
Patented Dec. 22, 1970

3,550,003

BINARY DATA TRANSMISSION SYSTEM USING "FUTURE," "PRESENT" AND "PAST" BITS FOR REFERENCE SYNCHRONIZATION

Leonard R. Halsted, Torrance, Calif., assignor to TRW Inc., Redondo Beach, Calif., a corporation of Ohio
Filed Oct. 17, 1966, Ser. No. 587,226
Int. Cl. H04l 27/26
U.S. Cl. 325—38 18 Claims

ABSTRACT OF THE DISCLOSURE

The invention is a modulation, demodulation, and decision making process for binary data transmission called Coherent Echo Modulation and Detection. The essential features of the invention are that the last $n$ data bits transmitted ($n$ is an interger, e.g., $n=100$) are used to modulate one of $n$ orthogonal subcarriers or signals and then each modulated subcarrier is again modulated by the next bit to be transmitted. All $n$ doubly modulated subcarriers are then transmitted, doubly demodulated, and the noisy measurements of the modulating data are retained and accumulated in properly weighted sums. These properly weighted sums determine current decisions as to what the last $n$ data bits transmitted were, and these decisions determine a reference used in the demodulating process. After $n$ bit periods following the initial transmission of a data bit, a final decision is made on that data bit, the weighted sum of measurements determining that final decision is discarded, and the bit no longer enters into the modulation, demodulation, and decision-making process. The full advantages are acquired gradually during the transmission of the first $n$ data bits.

This invention relates generally to a system for transmitting binary data.

Various communication systems exist which enable binary data to be transmitted between two or more remote stations. The characteristics of such systems can differ considerably, thus making each particularly suitable for a certain type environment. Thus, for example, a particular system may be best suited for a low noise narrow bandwidth environment while another system may be more appropriate in the presence of a high noise level where a wide bandwidth is acceptable.

As an example, multiple access communication systems are known in the prior art which do not use frequency or time division multiplexing, but rather employ an independently generated pseudo-random (PR) sequence in an attempt to make the interference due to other subscribers appear as white noise. Such a PR sequence is commonly generated synchronously at both the transmitter and receiver. At the transmitter, it is used to select or determine pseudo-randomly the signal to carry each bit of data. At the receiver, it is used to define a reference signal so that efficient signal detection can be maintained.

A data transmission system is referred to as a stored reference system if the reference signal is generated at the receiver, and as a transmitted reference system if both the reference signal and the data carrying signal are transmitted. Generally, stored reference systems have significant synchronization or acquisition problems. These problems are for the most part avoided in the transmitted reference system where the current reference is transmitted, but only at the expense of signal power and bandwidth.

The present invention is directed to an improved communication system in which the future, rather than the current, reference is transmitted. The future reference is a known function of the previously transmitted data and a starting reference or address data. As a consequence, only bit synchronization is required and neither additional signal power nor additional bandwidth are required for transmitting the reference. Synchronization acquisition is facilitated to an extent comparable to that of the transmitted (current) reference system but without the signal power and bandwidth penalties.

The invention furthermore provides for significant transmitter power savings compared to the stored reference system which savings are a consequence of two factors. Initially, as a consequence of doubly modulating, or in general $m$-fold modulating, the transmitted signal, power savings of 50% and more are realized in the case where there is no signal fading and the only interference is additive white gaussian noise. Secondly, by inherently providing both a time and frequency diversity, the invention provides a significant immunity to signal fading and to non-white and burst-type additive noise. Since this type of signal interference is commonly overcome by increasing the transmitted signal power, the immunity permits or is worth even further transmitter power savings.

A consequence of the transmitter power saving capabilities of the invention is that, when used in a multiple access system where a number of users transmit over a frequency band without time or frequency restriction, a significantly improved utilization of the frequency band is possible, e.g. the number of users accommodated could be increased by a factor of two or more.

Briefly, an embodiment of the present invention includes means for modulating signal energy in accordance with binary data to be transmitted together with means for demodulating signal energy at the receiver to recover the binary data. In essence, the system contemplates that the last $n$ data bits transmitted ($n$ is an integer, e.g. 100) are each used to modulate one of $n$ subcarriers or signals (which signals are preferably orthogonal to one another) and then all of the modulated subcarriers are again modulated by the next bit to be transmitted. All $n$ doubly modulated subcarriers are then transmitted, doubly demodulated, and the noisy measurements of the modulating data are retained and accumulated in properly weighted sums. These properly weighted sums are used to determine current decisions as to what the last $n$ data bits transmitted were, and these decisions are used to determine a sequence of reference bits which are used in the demodulating process. After $n$ bit periods following the initial transmission of a data bit, a final decision is made on that data bit.

In addition to an embodiment in which each subcarrier is doubly modulated (hereinafter referred to as a two-fold system), the invention also contemplates more complex $m$-fold systems.

The novel features that are considered characteristic of this invention are set forth with particularity in the appended claims. The invention will best be understood from the following description when read in connection with the accompanying drawings, in which:

Figure 1:
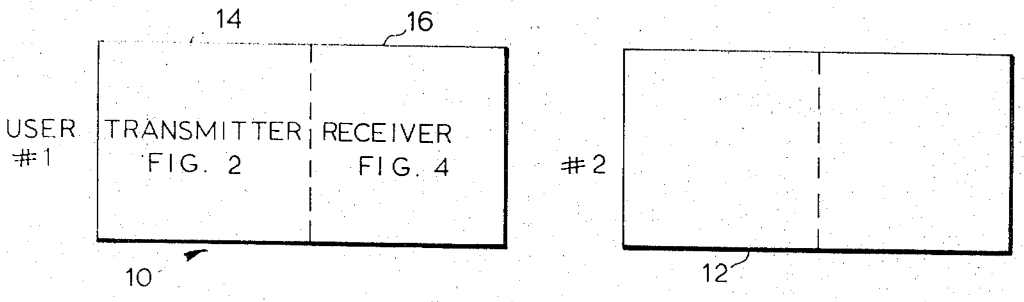
FIG. 1 is a block diagram generally illustrating two users communicating with one another employing a system in accordance with the present invention.

Attention is now called to FIG. 1 of the drawings which generally illustrates a pair of user stations 10 and 12, each adapted to transmit binary data to and receive binary data from the other station. Each station includes a transmitter section 14 and a receiver section 16.

Figure 2:
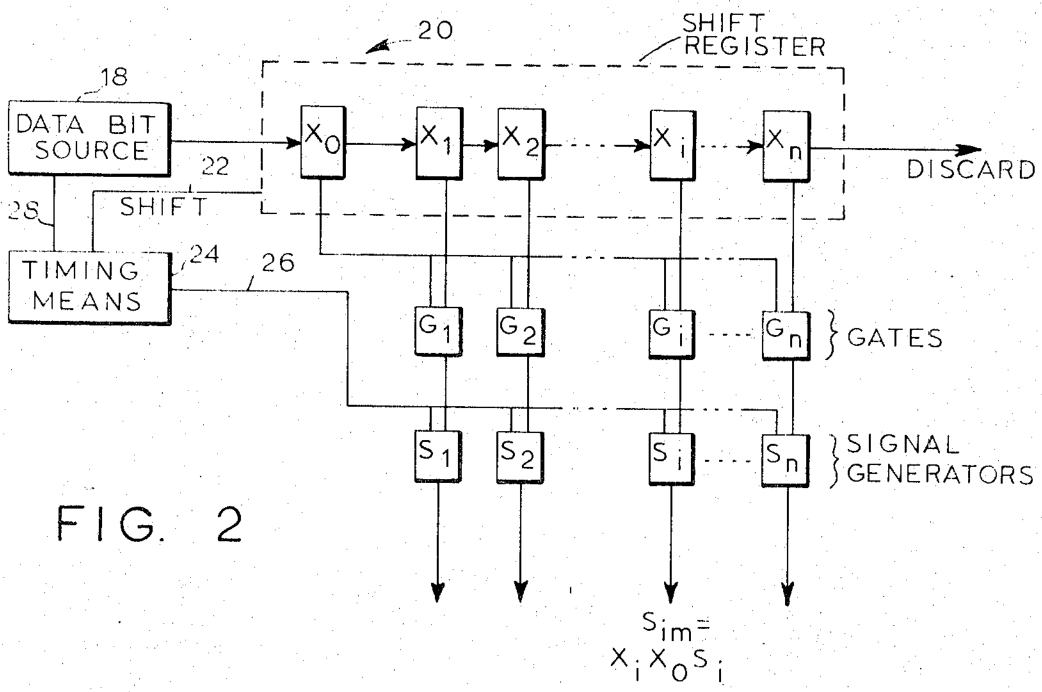
FIG. 2 is a block diagram of a transmitter which can be employed in the implementation of a two-fold system in accordance wtih the present invention.

Attention is now called to FIG. 2 which illustrates the details of a transmitter section 14 in accordance with one embodiment of the invention. Briefly, the transmitter section of FIG. 2 is based on the concept that each of a sequence of data bits (i.e. binary digits) will be used during $n+1$ bit periods to modulate the signals provided by $n$ signal generators. More particularly, in the embodiment of FIG. 2, during each successive bit period, each of the $n$ signal generators is modulated by the most recently provided data bit and by one of the $n$ previously data bits.

Thus, the transmitter section depicted by FIG. 2 includes a data bit source 18 which provides a sequence of data bits intended to be transmitted. The output of the data bit source is connected to the input of binary stage $X_0$ of a shift registed 20. The shift register 20 includes $n+1$ binary stages, and accordingly in addition to stage $X_0$, includes stages $X_1$–$X_n$. Various shift register implementations are known in the prior art and suffice it to say that in response to the application of a shift pulse on terminal 22 by a timing means 24, the state of each of the shift register stages will be shifted to the right one stage. Information shifted out of stage $X_n$ will be discarded.

In accordance with the present invention, the output of each of stages $X_1$–$X_n$ is connected to the input of a different one of $n$ gates $G_1$–$G_n$. In addition, the output of binary stage $X_0$ is connected to the input of all of the gates $G_1$–$G_n$. The output from each of the gates is connected to the input of a different one of $n$ signal generators $S_1$–$S_n$. The signal generators are controlled by timing means 24 via conductor 26.

Thus, in the operation of the transmitter section of FIG. 2, the data bit source 18 will provide a data bit to stage $X_0$ during each bit period defined by timing means 24 via conductor 28. Thus, during each bit period, each of the gates will be controlled in accordance with a particular one of the $n$ previously provided data bits and the most recently provided data bit stored in stage $X_0$. As noted, since each gate modulates a different one of the signal generators, the signals provided thereby will each be modulated in accordance with the most recently provided data bit and one of the $n$ previously provided data bits. In this manner, each data bit is effectively transmitted during $n+1$ bit periods.

In order to better understand the operation of the transmitter section of FIG. 2, attention is called to FIG. 3 which depicts an arbitrary sequence of data bits arranged such that the earliest occurring data bit is illustrated toward the right and the subsequently occurring data bits are illustrated in successive positions extending therefrom toward the left. Let it be assumed that the value of $n$ referred to in FIG. 2 is equal to five. Also, let it be assumed that the five bracketed data bits in the data bit sequence illustrated in FIG. 3 comprise the $n$ previously submitted data bits and that the circled data bit comprises the bit most recently provided by the data bit source 18. It should also be noted that the sequence of data bits is illustrated as being comprised of "+1's" and "−1's". The gates $G_1$–$G_n$ illustrated in FIG. 2 are asummed to be exclusive-Or gates so that they provide a true or positive output when the inputs thereto are alike and a false or negative output when the inputs thereto are not alike. In this manner, the gates $G_1$–$G_n$ can generate the arithmetic product of the data bits. In other words, if the two inputs to one of the gates are both "−1's", the gates will provide a positive or "+1" output. Similarly, if the two inputs are both "+1's", the gate will still provide a positive output. On the other hand, if one input to a gate is "−1" and the other is "+1", then the gate will provide a negative or "−1" output.

With the foregoing comments in mind, consider the states of binary stages $X_0$–$X_5$ during a bit period $T_1$ in which the circled data bit has just been stored in stage $X_0$. With the content of the stages $X_0$–$X_5$ as illustrated in FIG. 3, the signals provided by the generators $S_1$–$S_5$ will be modulated as represented. It should be recalled that all of the signal generators $S_1$–$S_n$ provide unique signals which, as will be explained in greater detail hereinafter, are preferably orthogonal to one another.

During the subsequent data bit period, $T_{1+1}$, the content of each of stages $X_0$–$X_4$ is shifted one stage to the right as illustrated as a new data bit (+1) is brought into stage $X_0$. Likewise, during each of the succeeding bit periods, a new data bit will be brought into the stage $X_0$ and the state of each of the other stages will be shifted to the right. Of course, each shifting operation involves the discarding of the previous content of stage $X_5$. As should now be understood from the tabular format of FIG. 3, the signal generators $S_1$–$S_5$ will each be modulated by a unique one of the $n$ previous data bits together with the most recently provided data bit. Mathematically, the modulated signal provided by any one of the signal generators can be expressed as $$S_{im}=X_i \cdot X_o \cdot S_i$$

where $i$ represents any number between 1 and $n$.

Figure 4:
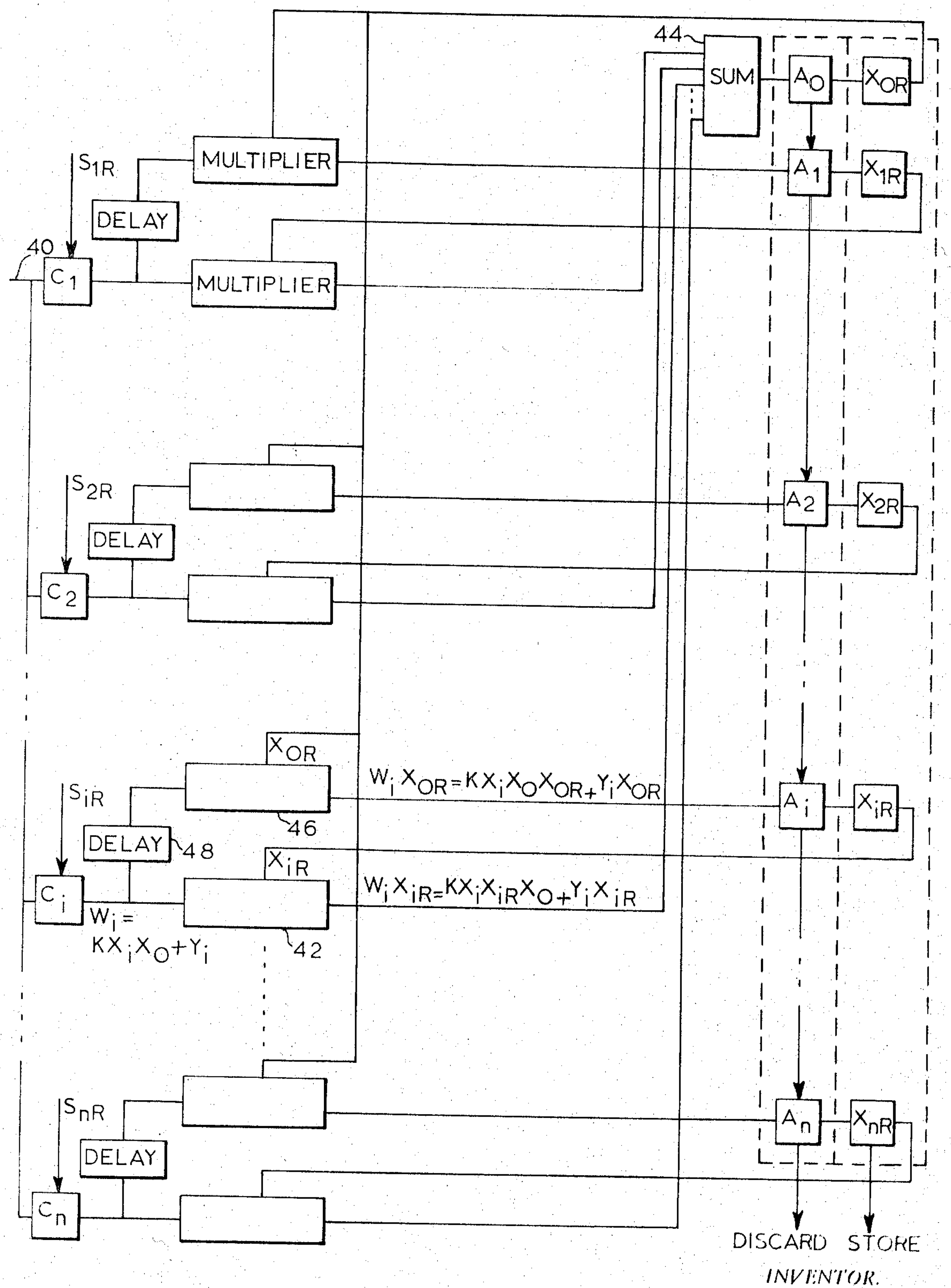
FIG. 4 is a block diagram of a receiver which can be employed in the implementation of a two-fold system in accordance with the present invention.

Attention is now called to FIG. 4 of the drawings which illustrates a receiver section 16 adapted to receive a composite signal having components $S_{1m}$, $S_{2m}$ . . . $S_{im}$ . . . $S_{nm}$ and in response thereto, to recreate the data bit sequence provided by the data bit source 18 at the transmitter. The receiver section operates upon the concept of developing a sequence of reference data bits which are stored in reference storage stages $X_{1R}$–$X_{nR}$. Each of the reference data bits, e.g. $X_{iR}$, is initially combined with the corresponding received signal component to recover the transmitted bit $X_0$. Thus, $n$ initial manifestations, each intended to represent $X_0$, are recovered and these are summed to develop a weight indicating the most likely value of $X_0$, i.e. +1 or −1. This value is then stored in a most recent digit storage stage $X_{0R}$ and is used to recover $n$ correction manifestations each intended to represent a different one of the $n$ preceding bits. These correction manifestations are utilized to correct the sequence of reference bits.

More particularly, the receiver section of FIG. 4 is comprised of a set of $n$ correlators $C_1$ . . . $C_i$ . . . $C_n$. The composite signal received from the transmitter which is of course comprised of $n$ modulated signal components, is provided to the input of each of the correlators via conductor 40. A different locally generated signal is provided to each of the correlators, each signal corresponding to the unmodulated signal provided by one of the signal generators of the transmitter section. Thus, a signal $S_{2R}$ corresponding to the unmodulated signal provided by signal generator $S_2$ of FIG. 2, is provided to correlator $C_2$ of FIG. 4. Accordingly each of the correlators will provide an output signal which is generally represented by the equation $$W_i=KX_iX_0+Y_i$$

where K represents a transmission attenuation factor and $Y_i$ represents noise introduced on the $i$ channel. Correlators suitable for isolating the respective signal components are readily known in the art and will not be considered in detail here. The ouput of each of these correlators is initially fed to a first multiplier 42 which multiplies the signal $W_i$ by a corresponding reference bit stored by previously mentioned stage $X_{iR}$. As a consequence, multiplier 42 will provide an output signal $$W_iX_{iR}=KX_iX_RX_0+Y_iX_{iR}$$

Let it be assumed that the noise level term $Y_iX_{iR}$ is not very great. Accordingly, the term $KX_iX_{iR}X_0$ should be equal to $KX_0$ whenever the reference bit $X_{iR}$ does in fact correspond to its transmitted counterpart $X_i$. Therefore, the multiplier 42 in each of the $n$ channels of the receiver section of FIG. 4 should provide an initial manifestation representing the state of the last data bit $X_0$. These manifestations provided by all of the multipliers 42 are coupled to the input of a summing network 44 which determines whether more multipliers 42 indicate that the bit $X_0$ is $-1$ or $+1$. If it is assumed that the noise level is sufficiently low that at least half of the channels will provide a correct indication, then the summing network should indicate the proper value of the transmitted bit $X_0$. The sum developed by the summing network 44 is stored in a most recent digit accumulating means $A_0$ which can comprise either an analog or digital store. The sum or weight stored in the accumulating means $A_0$ provides an indication of the reliability of the decision made with respect to $X_0$. That is, if all of the channels indicated the value of $X_0$ to be the same, e.g. $+1$ (assuming $K=1$), then the accumulating means $A_0$ would store a unanimous decision, e.g. $+n$. On the other hand, if all of the channels indicated that the bit $X_0$ was $-1$, then the accumulating means $A_0$ would again indicate a unanimous decision, e.g. $-n$. On the other hand, if about half the channels indicated the bit $X_0$ was $+1$ and about half indicated the bit $X_0$ was $-1$, then a value close to zero would be stored in the accumulating means $A_0$ indicating a low reliability for the decision with respect to the bit $X_0$. In any event, the accumulating means $A_0$ controls the state of the most recent digit storage stage $X_{0R}$. That is, if the sum stored in the accumulating means $A_0$ is positive, then a $+1$ will be stored in the storage stage $X_{0R}$ and if the sum is negative, then a $-1$ will be stored in the stage $X_{0R}$.

Prior to the receipt of a subsequent data bit, the sum stored in the accumulating means $A_0$ is shifted into accumulating means $A_1$. The accumulating means $A_1$ determines the state of stage $X_{1R}$ in the same manner as the accumulating means $A_0$ determined the state of the stage $X_{0R}$. However, prior to shifting the sum from one to the next accumulating means, the sum in each accumulating means is corrected by employing the newly determined most recent data bit stored in stage $X_{0R}$ to correct the other $n$ reference data bits stored in the stages $X_{1R} \ldots X_{iR} \ldots X_{nR}$.

In order to do this, the output of the stage $X_{0R}$ is coupled to the input of a multiplier 46 in each of the $n$ channels. A different correlator is connected through a delay means 48 to each of the multipliers 46. The delay means 48 are employed to permit the multipliers 42 to initially determine the value of $X_{0R}$ prior to it being used by multipliers 46. The multipliers 46 will provide an output signal $$W_iX_{0R}=KX_iX_0X_{0R}+Y_iX_{0R}$$

If the most recent digit $X_{0R}$ was properly determined, then the product $X_0X_{0R}$ will be equal to $+1$ and the signal provided by each of the multipliers 46 will properly indicate the value of one of the $n$ previous data bits. Thus the output of each multiplier 46 constitutes a correction manifestation which is added to the weight or sum carried by the corresponding accumulating means tending to correct or increase the reliability of the weight stored therein. It will be recalled that the magnitude of the sum carried by the accumulating means can be considered to represent the reliability of the decision made with respect to the corresponding reference data bit.

Accordingly, from the foregoing explanation of the operation of the receiver section of FIG. 4, it should be appreciated that $2 \cdot n$ separate correlation measurements are made with respect to each received data bit, i.e. $n$ initial manifestations are made simultaneously by the $n$ channels when the data bit first appears to establish the initial weight in the accumulating means $A_0$ and the initial state of the stage $X_{0R}$. As the weight is successively thereafter shifted through the accumulating means during the $n$ subsequent data periods, it is successively modified by $n$ sequential correction manifestations which in the absence of significant noise, will tend to increase the reliability of the decision as to the identity of the data bit. A final decision with respect to the identiy of a data bit is not made until the bit has been effectively shifted through $n+1$ reference storage stages $X_{0R}$–$X_{nR}$.

It is important to realize that the aforedescribed system incorporates inherent time and frequency diversity which significantly improves the likelihood that the data bits will be properly recovered. The system inherently incorporates time diversity in that each data bit is effectively transmitted over $n+1$ data bit periods and as a consequence, a burst of noise in one or more of these $n+1$ periods will not cause a complete loss of that data bit since it can very likely be properly ascertained from its transmission during other bit periods. The frequency diversity arises from the fact that each of the data bits will modulate each of the $n$ signal generators. If the $n$ signal generators generate orthogonal signals, and $n$ is large, then necessarily the bandwidth utilized to transmit the data is large (of the order of $n$) relative to that normally required to transmit the data. The inherent frequency diversity is implied by the use of this extra large bandwidth and the fact that the full bandwidth is utilized in transmitting each data bit since each bit modulates each signal at least twice. Thus, the bandwidth utilized in transmitting the data is fully utilized in the transmission of each data bit. Accordingly, even though noise may exist throughout a small portion of a wide frequency band, this should not prevent the data bit from being recovered throughout the remaining less noisy portions of the band.

Thus far, little has been said with respect to the particular signals provided by the signal generators $S_1 \ldots S_i \ldots S_n$ of FIG. 2. Prefrably, the signals should comprise a set of signals (functions) which are orthogonal to one another. Orthogonal signal generator ensembles are readily known in the art. One example is suggested by a typical pseudo-random signal. This ensemble is constructed using a sinusoidal carrier, dividing the bit period into $n$ equal disjoint subintervals, and defining the $j$th signal to coincide with the sinusoidal carrier during the $j$th subinterval and to be zero outisde the subinterval for $j=1, 2 \ldots n$. Another simple example is an ensemble consisting of $n$ sinusoidal carriers with the $j$th signal set equal to the $j$th carrier over the entire bit interval and set to zero outside this interval for $j=1, 2 \ldots n$. The carriers could be easily selected to be orthogonal over the bit period. Another example is a mixture of the first two. If $n$ can be written as the product $pq$ with $p$ and $q$ both integers, then the bit interval can be divided into $q$ equal disjoint subintervals and $p$ carriers can be selected so that each carrier can be used to define $q$ orthogonal signals (as in the second example). The carriers are easily selected to be orthogonal over each subinterval.

This following explanation is provided to clarify the operation of the receiver by means of an illustrative table of values that are stored or derived in the receiver in successive bit periods.

TABLE I

| | | X | $X_1$ | $X_2$ | $X_3$ | $X_4$ | $X_5$ | $S_1$ | $S_2$ | $S_3$ | $S_4$ | $S_5$ | $Y_2$ | $Y_3$ | $Y_4$ | Y |
|---|---|---|---|---|---|---|---|---|---|---|---|---|---|---|---|---|
| $T_1$ | −1 | 1 | 1 | 1 | 1 | 1 | −1 | −1 | −1 | −1 | −1 | 1 | −1 | 3 | −1 | −2 |
| $T_{1+1}$ | 1 | −1 | 1 | 1 | 1 | 1 | −1 | 1 | 1 | 1 | 1 | −1 | −2 | 1 | 3 | −2 |
| $T_{1+2}$ | 1 | 1 | −1 | 1 | 1 | 1 | 2 | −1 | 1 | 1 | 1 | 1 | −1 | 2 | −1 | −3 |
| $T_{1+3}$ | −1 | 1 | 1 | −1 | 1 | 1 | −1 | −1 | 1 | −1 | −1 | 2 | 3 | 2 | −2 | −1 |
| $T_{1+4}$ | 1 | −1 | 1 | 1 | −1 | 1 | −1 | 1 | 1 | −1 | 1 | 1 | −2 | 1 | 3 | −1 |
| $T_{1+5}$ | −1 | 1 | −1 | 1 | 1 | −1 | −1 | 1 | −1 | −1 | 1 | −2 | −2 | 1 | −1 | 2 |

| | $W_1$ | $W_2$ | $W_3$ | $W_4$ | $W_5$ | $A_1$ | $A_2$ | $A_3$ | $A_4$ | $A_5$ | $X_{1r}$ | $X_{2r}$ | $X_{3r}$ | $X_{4r}$ | X |
|---|---|---|---|---|---|---|---|---|---|---|---|---|---|---|---|
| $T_1$ | 0 | −2 | 2 | −2 | −3 | 5 | −1 | 8 | 6 | 8 | 1 | −1 | 1 | 1 | 5 |
| $T_{1+1}$ | −2 | −1 | 2 | 4 | −1 | −1 | 5 | 1 | 6 | 8 | −1 | 1 | 1 | 1 | 1 |
| $T_{1+2}$ | 2 | −2 | 3 | 0 | −2 | 6 | −3 | 4 | 3 | 10 | 1 | −1 | 1 | 1 | 1 |
| $T_{1+3}$ | 1 | 2 | 3 | −3 | −2 | 5 | 8 | −5 | 7 | 3 | 1 | 1 | −1 | 1 | 1 |
| $T_{1+4}$ | 0 | −1 | 2 | 2 | 0 | −5 | 4 | 6 | −8 | 10 | −1 | 1 | 1 | −1 | 1 |
| $T_{2+5}$ | −3 | −1 | 0 | −2 | 3 | −1 | −5 | 5 | 4 | −10 | −1 | −1 | 1 | 1 | −1 |

TABLE II

| | $W_1X_{1r}$ | $W_2X_{2r}$ | $W_3X_{3r}$ | $W_4X_{4r}$ | $W_5X_{5r}$ | $A_o$ | $X_{or}$ | $W_1X_{0r}$ | $W_2X_{0r}$ | $W_3X_{0r}$ | $W_4X_{0r}$ | $W_5X_{0r}$ | $A_1$ | $A_2$ | $A_3$ | $A_4$ | $A_5$ | $X_{1r}$ | $X_{2r}$ | $X_{3r}$ | $X_{4r}$ | $X_5$ |
|---|---|---|---|---|---|---|---|---|---|---|---|---|---|---|---|---|---|---|---|---|---|---|
| $T_1$ | 0 | 2 | 2 | −2 | −3 | −1 | −1 | 0 | 2 | −2 | 2 | 3 | 5 | 1 | 6 | 8 | 11 | 1 | 1 | 1 | 1 | 1 |
| $T_{1+1}$ | 2 | −1 | 2 | 4 | −1 | 6 | 1 | −2 | −1 | 2 | 4 | −1 | −3 | 4 | 3 | 10 | 7 | −1 | 1 | 1 | 1 | 1 |
| $T_{1+2}$ | 2 | 2 | 3 | 0 | −2 | 5 | 1 | 2 | −2 | 3 | 0 | −2 | 8 | −5 | 7 | 3 | 8 | 1 | −1 | 1 | 1 | 1 |
| $T_{1+3}$ | 1 | 2 | −3 | −3 | −2 | −5 | −1 | −1 | −2 | −3 | 3 | 2 | 4 | 6 | −8 | 10 | 5 | 1 | 1 | −1 | 1 | 1 |
| $T_{1+4}$ | 0 | −1 | 2 | −2 | 0 | −1 | −1 | 0 | 1 | −2 | −2 | 0 | −5 | 5 | 4 | −10 | 10 | −1 | 1 | 1 | −1 | 1 |
| $T_{1+5}$ | 3 | 1 | 0 | −2 | −3 | −1 | −1 | 3 | 1 | 0 | 2 | −3 | 2 | −4 | 5 | 6 | 13 | 1 | −1 | 1 | 1 | −1 |

Figure 3:
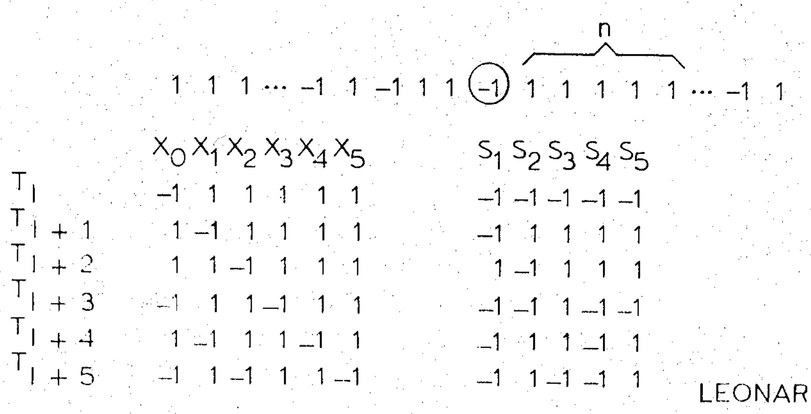
FIG. 3 illustrates a typical binary sequence and shows the manner in which the elements of FIG. 2 are controlled to transmit such a sequence.

In Table I the contents of FIG. 3 are repeated to show, for bits period $T_1$, $T_{1+5}$ . . . $T_{1+5}$ the preceding 5 binary digits, the currently provided digit, and the 5 modulating signals.

It is assumed for illustrative purposes in this example, that K=1 and that the time required for modulating, transmitting, and demodulating the signals $S_1$, $S_2$ . . . $S_5$ can be ignored. Accordingly, the values stored and derived in the receiver during the corresponding bit periods $T_1$, $T_{1+1}$ . . . $T_{1+5}$ are shown.

In Table I the values $Y_1$, $Y_2$ . . . $Y_5$ represents the additive noise terms that are added respectively to the modulating signals listed under $S_1$, $S_2$ . . . $S_5$, to form the output signals $W_1$, $W_2$ . . . $W_5$ of correlators $C_1$, $C_2$ . . . $C_5$. Observe that the receiver can best be understood by relating the tables in Tables I and II to the receiver diagram in FIG. 4. For example, $W_1$ is the sum of $Y_1$ and the term $X_0X_1$ listed under $S_1$.

In Table I the values listed under $A_1$, $A_2$ . . . $A_5$ are the contents of the accumulating means $A_1$, $A_2$ . . . $A_5$ shown in FIG. 4 at the start of the bit period. Also in Table I the values listed under $X_{1r}$, $X_{2r}$ . . . $X_{5r}$ are the current best estimates at the start of the bit period of the last 5 binary digits that were transmitted. Observe that $X_{2r}$ at the start of the bit. $T_1$ is in error. The values listed under $X_{1r}$, $X_{2r}$ . . . $X_{5r}$ are stored in the digit storage stages $X_{1r}$, $X_{2r}$ . . . $X_{5r}$ shown in FIG. 4 and are determined respectively by the contents of accumulating means $A_1$, $A_2$ . . . $A_5$. If the value stored in an accumulating means is negative, the corresponding digit storage stage will contain a −1; otherwise the digit storage stage will contain a +1.

The results of operations performed in the receiver during the bit period are largely shown in Table II, i.e., the results of operation performed after receipt of measurements $W_1$, $W_2$ . . . $W_5$. The first operation is to compute, using multiple 42 shown in FIG. 4, the products $W_1X_{1r}$, $W_2X_{2r}$ . . . $W_5X_{5r}$. In Table II the values shown under $W_1X_{1r}$, $W_2X_{2r}$ . . . $W_5X_{5r}$ are results of taking the values of $W_1$, $W_2$ . . . $W_5$ and $X_{1r}$, $X_{2r}$ . . . $X_{-r}$ shown in Table I and performing the indicated multiplications.

The next operation to be performed is to sum the values $W_1X_{1r}$, $W_2X_{2r}$ . . . $W_5X_{5r}$ coming out of multiplier means 42 in the summing network 44 shown in FIG. 4. The resultant sum is stored in accumulating means $A_0$. This is illustrated in Table II by listing under $A_0$, the sum of the values listed under $W_1X_{1r}$, $W_2X_{2r}$ . . . $W_5X_{5r}$.

After the value to be stored in accumulating means $A_0$ has been determined the contents of digit storage stage $X_{0r}$ are determined. If the value in $A_0$ is negative, a −1 is stored in $X_{0r}$; otherwise a +1 is stored in $X_{4r}$. This is illustrated in Table II.

After the contents of $X_{0r}$ have been determined, they are used to form the products $W_1X_{0r}$, $W_2X_{0r}$ . . . $W_5X_{0r}$ shown in FIG. 4, using multiplying means 46. Delay means 48 shown in FIG. 4 insures that these products are not formed until the contents of $X_{0r}$ have been determined. This operation is illustrated in Table II by showing $W_1X_{0r}$, $W_2X_{0r}$ . . . $W_5X_{0r}$ to be the product of $X_{0r}$ listed in Table II and the values $W_1$, $W_2$ . . . $W_5$ respectively that are listed in Table I.

When the products $W_1X_{0r}$, $W_2X_{0r}$ . . . $W_5X_{0r}$ have been computed, they are added respectively to the contents of accumulating means $A_1$, $A_2$ . . . $A_5$. This is illustrated in Table II by showing the sum of the values under $A_1$, $A_2$ . . . $A_5$ in Table I and those under $W_1X_{0r}$, $W_2X_{0r}$ . . . $W_5X_{0r}$ in Table II. For example, in Table II, the value under $A_5$ in bit period $T_1$ is the sum of the value $W_5X_{0r}$ in bit period $T_1$ and the value under $A_5$ in Table I for bit period $T_1$.

Next, the contents in digit storage stages are adjusted to indicate any change in the signs of the contents of the accumulating means $A_1$, $A_2$ . . . $A_5$. For example, the sign of $A_2$ is changed in bit period $T_1$ when $W_2X_{0r}$ is added. The contents of digit storage $X_{2r}$ is accordingly changed to a +1.

The final operation is to shift the contents of $A_0$, $A_1$ . . . $A_4$ respectively into accumulating means $A_1$, $A_2$ . . . $A_5$, and similarly the contents of $X_{0r}$, $X_{1r}$ . . . $X_{4r}$ into $X_{1r}$, $X_{2r}$ . . . $X_{5r}$. This is illustrated in Table I and Table II by showing that the final contents of $A_0$, $A_1$ . . . $A_4$ in a bit period are respectively the starting contents of $A_1$, $A_2$ . . . $A_5$ in the subsequent bit period. Similarly the final contents of $X_{0r}$, $X_{1r}$ . . . $X_{5r}$ in a bit period are the starting contents respectively of $X_{1r}$, $X_{2r}$ . . . $X_{5r}$ in the subsequent bit period. The final contents of $A_5$ are discarded and the final contents of $X_{5r}$ are stored as a final decision on the value of the bit transmitted 6 bit periods previously.

Although the foregoing explanation of the operation of the transmitter section of FIG. 2 and receiver section of FIG. 4 is though sufficient to fully teach an embodiment of the present invention, a more rigorous mathematical treatment is presented as follows:

Assume at first that at least $n$ data bits have been transmitted and denote the last $n$ bits transmitted as $X_1$, $X_2$ . . . $X_n$, indexed in the reverse order of their transmission, with $X_0$ the next bit to be transmitted. The data bits are assigned values ±1. Let the next bit period be denoted by the interval (0, T) where T is the duration of the bit period in seconds or the reciprocal of the data bit rate. Let $S_1$, $S_2$ . . . $S_n$ be a set of signals (functions) which are orthonormal over the interval (0, T), i.e.

$$(1)\quad \int_0^T S_i(t)S_j(t)dt=\begin{cases}1 \text{ if } i=j & i=1, 2 \ldots n\\ 0 \text{ if } i\neq j & j=1, 2 \ldots n\end{cases}$$

The signal transmitted during the next bit period is $$(2)\quad S(t)=KX_0\sum_{i=1}^{n} X_iS_i(t) \quad 0\leq t<T$$

where K is the transmitted amplitude factor.

At the receiver the attenuated signal is received in additive noise and has the form (neglecting the propagation time)

$$(3)\quad Z(t)=KX_0\sum_{i=1}^{n} X_iSi(t)+X(t) \quad 0\leq t<T$$

where Y(t) denotes the additive interference and K is the received amplitude factor. Correlation of the received signal with each of the $n$ orthonormal signals provides the basic measurements $$(4)\quad W_i=\int_0^T Z(t)S_i(t)dt=KX_0X_i+Y_i \quad i=1, 2 \ldots n$$

where $Y_j$ is a noise term due to the interferfence $Y(t)$.

Let the current decisions as to the last in data bits transmitted be denoted by $X_{1R}$, $X_{2R}$ . . . $X_{nR}$. Corresponding to $X_{iR}$ for $i=1, 2 \ldots n$ is a measurement $A_i$ which is a weighted sum of terms each of the form given by Equation 4. The manner in which these $A_1$ are determined will become clear by following the detection process through one bit period. The values of the $X_{iR}$ are determined by the sign of the $A_i$, i.e.

$$(5)\quad X_i=\begin{cases}+1 \text{ if } A_i\geq 0\\ -1 \text{ if } A_i<0\end{cases} \quad i=1, 2 \ldots n$$

The initial decision $X_{0R}$ is determined from the value of $$(6)\quad A_0=\sum_{i=1}^{n} W_iX_{irR}=KX_oG+\sum_{i=1}^{n} Y_iX_{iR}$$

where G is the number of correct decisions among $X_{1R}$, $X_{2R}$ . . . $X_{nR}$, less the number of incorrect decisions. The decision $X_{0R}=+1$ is made if $A_0\geq 0$; otherwise the decision is $X_{0R}=-1$.

The value of $X_{0R}$ is now used to modify the value of $A_i$ for $i=1, 2 \ldots n$ by adding to it $$(7)\quad X_{0R}W_i=KX_{0R}X_0X_i+X_{0R}Y_i$$

Observe that $X_{0R}X_0=+1$ if $X_{0R}$ is correct and $X_{0R}X_0=-1$ if $X_{0R}$ is incorrect. If $X_{0R}$ is correct the addition of K $X_{0R}$ $X_0$ $X_i$ cause $A_i$ to be increased if $X_j=+1$ and decreased if $X_i=-1$, i.e. if shifts $A_i$ in the right direction for making a correct decision. If $X_{0R}$ is incorrect the addition of $KX_{0R}X_0X_i$ has the opposite effect, changing $A_i$ in the wrong direction. After modifying the value of $A_i$, the value of $E_{iR}$ is redetermined by epuation 5 for $i=1, 2 \ldots n$. The value of $X_{nR}$ now determines the final decision as to the value of $X_n$. The value of $A_n$ is discarded but the current values of $X_0$, $X_1$ . . . $X_{n-1}$ and $A_0$ . . . $A_{n-1}$ are retained for use and modification during the next bit period.

For transmission of the first $n$ data bits, an $n$ bit address vector is used in determining the reference signal. The reference for transmitting the $k$th data bit, $k=1, 2 \ldots n$, is determined by the $k-1$ preceding data bits and $n-k+1$ bits from this address vector. The detection process in the same as though $n$ data bits had been transmitted except that no measurements are retained for the purpose of possibly altering those bits in the reference that are from the address vector. Following each of the first $n$ data bit transmissions one bit from the address vector leaves the reference as a "final decision."

The following information is included by way of review and to more fuly describe how the received information is recovered.

Referring now to FIG. 4, observe that the first operations performed for information recovery are the $n$ correlation operations performed in correlators $C_1$, $C_2$ . . . $C_n$. These operations are performed concurrently and are completed in one bit period. Recall that the receiver operates in synchronism with the transmitter, e.g., the requirement for bit synchronization is stated on page 3. The corelation operations are defined mathematically by Equation 4 on page 18.

As soon as the correlation operations are completed, the resulting measurements are delivered to multiplier means 42 and delay means 48. The correlators $C_1$, $C_2$ . . . $C_n$ then repeat these correlation operations over the next bit period. The following sequence of operations is also completed within the next bit period.

(a) The measurements $W_1$, $W_2$ . . . $W_n$ delivered to multiplier means 42 are multiplied respectively by the current estimates $X_{1r}$, $X_{2r}$ . . . $X_{nr}$ of the last $n$ transmitted bits. Since each of these estimates has either value +1 or −1, this amounts to no more than changing the signs of some of the measurements $W_1$, $W_2$ . . . $W_n$. Observe that this operation represents an attempt to demodulate the received signal components except for the modulation by the bit $X_0$.

(b) Next, the modified measurements $W_1X_{1r}$, $W_2X_{2r}$ . . . $W_nX_{nr}$, are summed by summing means 44 and the sum is stored as measurement $A_0$. Note that the symbols $A_0$, $A_1$ . . . $A_n$ are used in the specifications to refer to both the set of measurement accumulating means and the corresponding accumulated values, but that the use of these symbols in eah case is clear. Observe also that when both the demodulation attempt of operation (a) is largely successful and the level of the additive noise is comparatively low, then $A_0$ represents a good indicator of the state of the transmited bit $X_0$.

(c) The value of $X_{0r}$ is determined next according to the sign of $A_0$. If $A_0\geq 0$ then $X_{0r}=+1$, and if $A_0<0$, then $X_{0r}=-1$.

(d) Each of the measurements $W_1$, $W_2$ . . . $W_n$ is now received from delay means 48, delivered to multiplier means 46, and multiplied by $X_{0r}$. As in operation (a), this amounts to at most changing the signs of some of the measurements. Observe that this operation represents an attempt to demodulate the received signal components of the bit $X_0$.

(e) Next, the modified measurements $W_1X_{0r}$, $W_2X_{0r}$ . . . $W_nX_{nr}$, are added to the meurement values $A_1$, $A_2$ . . . $A_n$, respectively. The new or resulting values of $A_1, A_2 \ldots A_n$ are now taken as the most reliable indicators of the values of the bits $X_1, X_2 \ldots X_n$.

(f) The values of $X_{1r}, X_{2r} \ldots X_{nr}$ are redetermined according to the signs of $A_1, A_2 \ldots A_n$, respectively, or as follows:

$$X_{ir}=\begin{cases}+1 \text{ if } A_i \geq 0 \\ -1 \text{ otherwise}\end{cases} \quad i=1, 2 \ldots n$$

(g) The value in $A_n$ is now discarded and the values in $A_0, A_1 \ldots A_{n-1}$ are shifted respectively to $A_1, A_2 \ldots A_n$.

(h) The value of $X_{nr}$ is stored as a final decision as to the value of $X_n$, and the values of $X_{0r}, X_{1r} \ldots X_{n-1r}$ are shifted to become respectively the values of $X_{1r}, X_{2r} \ldots X_{nr}$.

The above sequence of operations is repeated each bit period.

The following will provide an example of the accumulating means illustrated in FIG. 4 as $A_0, A_1 \ldots A_n$.

Digital accumulating means wil be described. The components of each such means consist of the following:

(a) An analog to digital converter capable of digitizing an analog value when pulsed and with the capability of holding the digital output number in preparation for a summing operation.

(b) An input digital storage unit which can accept a digital number and hold it in preparation for a summing operation.

(c) A digital summer capable of adding two stored digital numbers when pulsed, and transferring the sum to an output storage unit.

(d) An output storage unit capable of accepting and storing a digital number, and of transferring that number when pulsed to an input storage unit of the type described in (b).

Such components are well within the state of the art. The timing means necessary for maintaining bit synchronization can be readily constructed to also provide for timing or pulsing the above components so that they operate in synchronism.

The following will describe more fully how the signal is corrected in the accumulating means and reference stages $X_{0r}, X_{1r} \ldots X_{nr}$.

The procedure used to determine the contents of both the accumulating means and reference stages at the end of each bit period has been described more fully previously. Observe that as measurements are accumulated, the probability of correctly estimating the transmitted bit increases, providing the signal-to-noise ratio is in excess of some minimum value. This implies that as accumulated measurements are modified and shifted through the accumulating means, some will change sign. Consequently, the corresponding estimate of the transmitted bit will be reversed. Only in this sense can errors be said to be corrected.

The following will more fully describe how the signals stored in accumultor stage $A_0$ are shifted through to stage $A_n$.

Note that after $A_0$ is computed, it is stored in accumualting means $A_0$. At the end of the bit period, the contents are shifted into $A_1$. During the next period, the contents of $A_1$ are modified, i.e, a "correction" term or additional measurement is added in, and at the end of that period, the contents are shifed to $A_2$. This procedure of add and shift is repeated each bit period until the final contents are shifted out of $A_n$. Note that as these contents are modified and shifted along, they continue to refer to the same transmitted bit and, in particular, they indicate the value of that bit.

Figure 5:
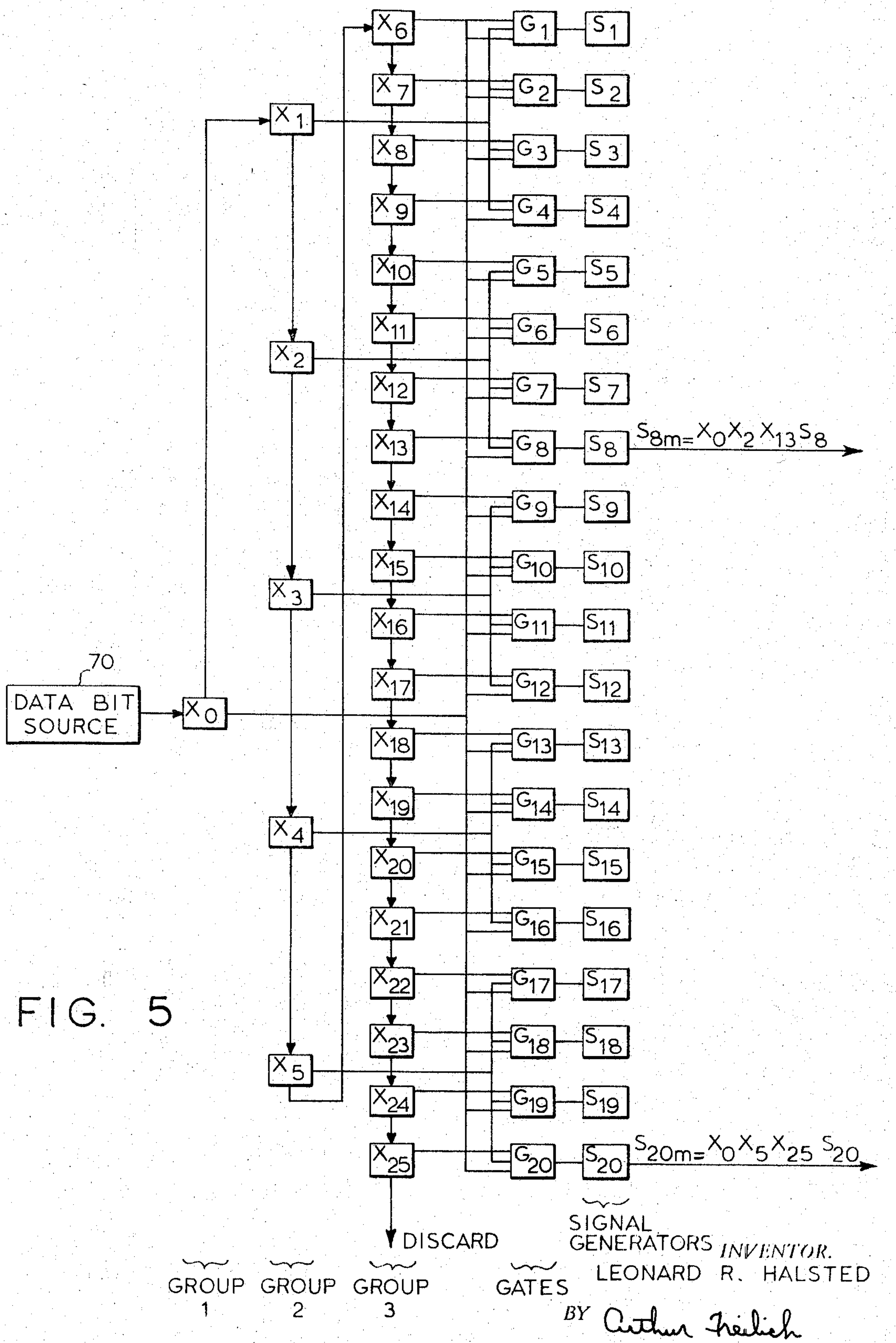
FIG. 5 is a block diagram of a transmitter which can be employed in the implementation of a three-fold system in accordance with the present invention.

More particularly, the transfer section of FIG. 5 includes a data bit source 70 which sequentially provides bits to the first stage $X_0$ of a shift register illustrated as being comprised of twenty-six stages (i.e. $X_0$–$X_{25}$). The twenty-six stages of the shift register can be considered as being arranged in three groups with the first group including just one stage $X_0$, the second group including five stages $X_1$–$X_5$, and the third group including twenty stages $X_6$–$X_{25}$. The stages $X_0$–$X_{25}$ are interconnected such that in response to control pulses provided by a control and timing means (not shown) the content of each stage is shifted to a subsequent stage during each bit period. Bits shifted out of stage $X_{25}$ are discarded.

The transmitter section of FIG. 5 employs a number of signal generator equal to the number of stages in the third group of the shift register. Accordingly, inasmuch as the third group of shift register stages in FIG. 5 is comprised of twenty stages, twenty signal generators $S_1$–$S_{20}$ are provided. As in the embodiment of FIG. 4, the signals provided by the signal generators are preferably orthogonal with respect to one another. The input to each signal generator is derived from the output of a different one of twenty modulating gates $G_2$–$G_{20}$. The inputs to each modulating gate are uniquely connected to one stage from each of the three groups of shift register stages. Thus, for example, inputs to the gate $G_8$ are derived from the stage $X_0$, the stage $X_2$, and the stage $X_{13}$. Similarly, inputs to the gate $G_{20}$ are derived from the stage $X_0$, the stage $X_5$, and the stage $X_{25}$.

In the operation of the transmitter section of FIG. 5, data bits are sequentially fed to the stage $X_0$ and then successively shifted through the stages $X_1$–$X_{25}$. Inasmuch as three stages controls each gate, and inasmuch as each particular bit is shifted through twenty-six stages during twenty-six successive data bit periods, each bit modulates each signal during at least three different bit periods. Accordingly, the inherent frequency and time diversity of the system should be readily appreciated inasmuch as each bit is transmitted during each of twenty-six successive bit periods to provide time diversity and over twenty different signal channels to provide frequecy diversity.

Figure 6:
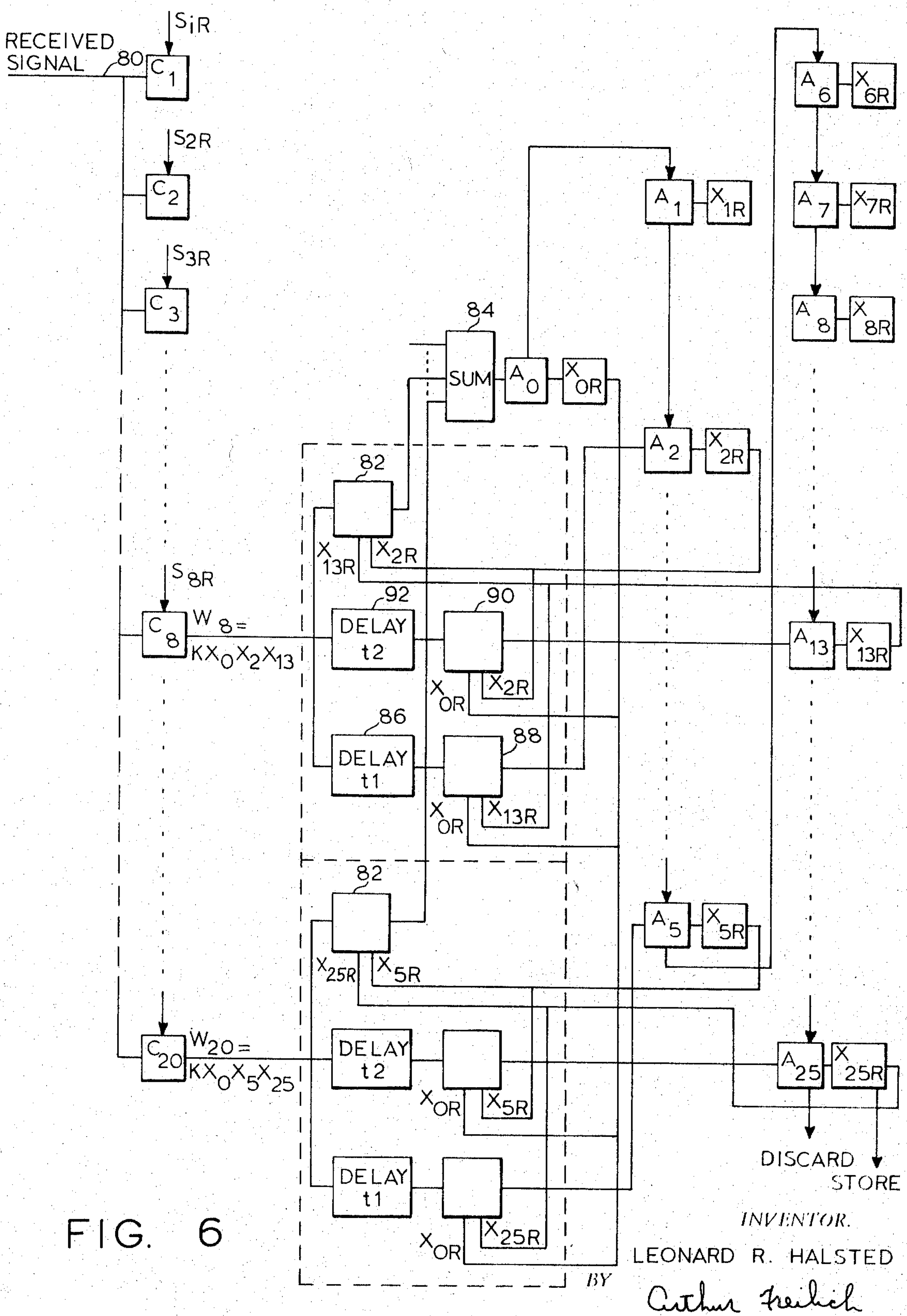
FIG. 6 is a block diagram of a receiver which can be employed in the implementation of a three-fold system in accordance with the present invention.

The composite signal transmitted by the twenty signal generators of the transmitter section of FIG. 5 is received via conductor 80 of the receiver section of FIG. 6. The composite signal is applied to each of twenty correlators $C_1$–$C_{20}$. Also applied to each correlator is a locally generated signal, e.g. $S_{1R}$–$S_{20R}$ which permits each correlator to isolate a different one of the twenty signal components. The signal component isolated by the correlator $C_8$ can be represented by the amplitude $W_8=KX_0X_2X_{13}$ (neglecting noise). In order to ascertain from this signal the most recent data bit $X_0$, previously determined reference bits $X_{2R}$ and $X_{13R}$ are employed.

In order to do this, as in the embodiment of FIG. 4, a plurality of reference storage stages $X_{0R}$–$X_{25R}$, corresponding to the twenty-six stages in the transmitter section of FIG. 5, are provided. Associated with each binary reference storage stage $X_{0R}$–$X_{25R}$ is an accumulating means (either analog or digital) $A_0$–$A_{25}$. As was explained in the embodiment of FIG. 4, the reference storage stages $X_{0R}$–$X_{25R}$ are employed to store previously determined reference data bits.

Thus, consider for example the channel in the receiving section of FIG. 6 which supplies received signal component $W_8$ to the multiplier 82 to which is also supplied the output of reference storage stages $X_{2R}$ and $X_{13R}$. As a consequence, assuming that the peviously determined reference bits $X_{2R}$ and $X_{13R}$ are correct, the multiplier 82 will provide an initial manifestation on its output line representing the most recent data bit, i.e. $X_0$. The outputs of all of the multipliers 82 are supplied to a summing network 84 which, as in the embodiment of FIG. 4, sums all of the initial manifestations provided thereto to develop a weight which as previously explained is related to the reliability of the decision of the state of bit $X_0$. That is, if all of the multipliers 82 agree on the identity of bit $X_0$, then the weight determined by the summing network 84 will be at a maximum. On the other hand, if noise detriments the transmission in at least half of the channels, then the summing network 84 may develop a weight close to zero indicating a low reliability. In any event, this weight is stored in the most recent digit accumulating means $A_0$ and determines the state of the reference storage stage $X_{0R}$. That is, as was previously mentioned, if the content of the accumulating means $A_0$ is positive, the state of reference storage stage $X_{0R}$ will be forced to +1. On the other hand, if the content of accumulating means $A_0$ is negative, then stage $X_{0R}$ can be forced to −1.

After a delay of *t1* introduced by delay means 86 sufficient to assure that the most recent digit determination has been made, the identity of the most recent digit in stage $X_{0R}$ is employed to next develop a correction manifestation with respect to one of the other digits. Thus, as is shown with respect to the signal $W_8$, the output of stages $X_{0R}$ and $X_{13R}$ are applied to a multiplier 88 which, after a delay *t1* introduced by delay means 86 sufficient to permit stage $X_{0R}$ to settle, will provide a correction manifestation related to the identity of bit $X_{2R}$. In the specific system illustrated, it will be appreciated that four different multipliers 88 respectively associated with correlators $C_5$–$C_8$ will simultaneously provide correction manifestations to accumulating means $A_2$. As long as the weight stored by accumulating means $A_2$ remains positive, the associated storage stage $X_{2R}$ will define a data bit of +1, and on the other hand, if at any time the correction manifestations cause the weight to go negative, the corresponding storage stage will be forced to define a data bit of −1.

After the reference digits of the second group have been determined, they can be employed along with the most recent reference bit stored in stage $X_{0R}$ to develop correction manifestations for the third group of reference bits. Thus, the output of stages $X_{0R}$ and $X_{2R}$ are provided to a multiplier 90 after a delay *t2* introduced by delay means 92. Multiplier 90 will provide a correction manifestation to the corresponding accumulating means. Thus, the multiplier 90 associated with the correlator $C_8$ will correct the weight in accumulating means $A_{13}$ which of course controls the state of the storage stage $X_{13R}$. After correction manifestations have been provided to the second and third groups of reference storage stages, the weights stored in the accumulating means $A_0$–$A_{24}$ are shifted to a subsequent accumulating means. The weight stored in accumulating means $A_{25}$ is discarded. The data bit stored in reference storage stage $X_{25R}$ is stored as a final decision. Thereafter, the receiver section of FIG. 6 is then ready to receive a new data bit during a subsequent bit period.

In addition to the foregoing, embodiments of the invention inherently possess an adaptive capability which has not thus far been stressed. This capability may prove useful in the acquisition of a transmitted signal. Briefly, suppose the receiver is turned on so that the sequence of receiver operations such as correlations, decision making, combining correlation measurements, shifting, etc., is initiated. Note that normally measurements in accumulating means $A_1$–$A_n$ represent a type of bias or what might be considered an indication of the proper reference. Suppose that all such bias is removed and the receiver is not otherwise disposed to expect a fixed signal (initial reference) before starting to accumulate measurements in $A_1$–$A_n$. If then a proper signal (receiver is designed to match the transmitter) is being transmitted, the receiver will be operating on this signal, making decisions, and accumulating measurements. At any point, either of two cases will usually exist; either there will be more than half, or less than half, of the current decisions $X_{1R}$–$X_{nR}$ in error. In either case, the measurements accumulated will tend to reinforce the decision and sustain that case. For example, if initially more than half of the reference decisions $X_{1R}$–$X_{nR}$ were correct, and supposing the signal to noise ratio is large enough to sustain reliable communication, the decision $X_{0R}$ would tend to be correct, and if so, would provide the proper correction manifestations to $A_1$–$A_n$ to improve the reference by reducing the numbers of errors. Note at this point the measurements in $A_1$–$A_n$ would be of small magnitude so that sign changes could be readily accomplished. As the number of errors in $X_{1R}$–$X_{nR}$ is reduced, the probability of making the decision $X_{0R}$ correctly is increased. Thus, the receiver tends to adapt its reference to the transmitted signal. This is true in either case. In the case where initially more than half of $X_{1R}$–$X_{nR}$ were incorrect, the receiver will tend to adjust the reference to the negative or mirror image of the correct reference, and it is only ncessary to recognize this fact in interpreting final decisions.

From the foregoing, it should be appreciated that a system has been disclosed herein suitable for transmitting and receiving binary data. As pointed out, the system is based on the concept of transmitting a future reference for facilitating data bit recovery at the receiver. Because of the inherent time and frequency diversity of the system and the *m*-fold modulation, lower signal to noise ratios can be tolerated before any data is lost. Alternatively, the system enables users to transmit at lower power levels than required by other systems for similar signal to noise ratios.

What is claimed is:

1. A system for transmitting an ordered sequence of binary digits 0, 1, 2 . . . *n* wherein said digits *n* and 0 are respectively earliest and latest in said sequence, said system including:

*n* signal generators;

means responsive to each of said digits 1, 2 . . . *n* for modulating a different one of said signal generators; and means responsive to said digit 0 for modulating all of said signal generators.

2. The system of claim 1 wherein each of said *n* signal generators provides a signal orthogonal to the signal provided by each of said other signal generators.

3. In combination:

a source providing a sequence of binary digits;

*n* generators each providing a unique signal;

means for individually modulating said *n* generators; and each of said digits in sequence starting with a specified starting digit simultaneously modulating all of said *n* generators for a single bit period;

each of said digits beginning with said starting digit subsequently modulating each of said *n* generators in sequence for one bit period starting with the first generator.

4. The combination of claim 3 wherein said signals provided by said *n* generators are all orthogonal to one another.

5. The combination of claim 3 wherein said means for developing said set of *n* modulating signals includes a shift register having *n*+1 stages;

means initially providing said binary digits to a first of said *n*+1 shift register stages;

*n* gates; and means coupling said first shift register stage to all of said gates and each of said other shift register stages to a different one of said gates.

6. The combination of claim 3 including means for demodulating said *n* modulated signals, said means for demodulating including means for continually developing a sequence of *n* reference binary digits intended to correspond to said *n* previously provided binary digits.

7. The combination of claim 6 wherein said means for developing said sequence of reference digits includes *n* reference storage stages each capable of storing one of said reference digits, and means responsive to each of said reference storage stage for demodulating the one of said *n* modulated signals corresponding thereto for developing *n* initial manifestations each intended to represent said most recently provided binary digit.

8. The combination of claim 7 including a most recent digit accumulating means for developing a sum of said initial manifestations to determine said most recently provided binary digit and a most recent digit storage stage responsive to said most recent digit accumulating means.

9. The combination of claim 8 including means responsive to said most recent digit storage stage and each of said $n$ modulated signals for developing $n$ correction manifestations each intended to represent a different one of said $n$ previously provided binary digits.

10. The combination of claim 9 including $n$ accumulating means each coupled to a different one of said $n$ reference storage stages for controlling the state thereof; and means applying each of said $n$ correction manifestations to a different one of said $n$ accumulating means.

11. The combination of claim 10 including means for shifting the contents of said most recent digit accumulating means to a first of said $n$ accumulating means and for shifting the contents of each of said $n$ accumulating means to a subsequent one of said $n$ accumulating means.

12. In a digital data communication system:
- a source of successive binary digits;
- at least first and second groups each comprised of one or more binary stages;
- means successively applying said binary digits to a first of said stages;
- means for shifting the contents of each of said stages, other than a last stage thereof, to an immediately succeeding stage between the successive application of binary digits to said first stage;
- a plurality of generators each providing a unique signal;
- a plurality of modulator means, each responsive to one stage from each of said groups; and
- means coupling each of said modulator means to a different one of said generators for modulating the signal provided thereby.

13. The system of claim 12 wherein said first group consists only of said first stage.

14. The system of claim 12 wherein said signals provided by said generators are orthogonal to one another.

15. In a digital communication system for transmitting and receiving a sequence of binary digits provided by a data source;
- means for storing in order the last $n$ binary digits provided by said source;
- $n$ generators each providing a unique signal; and
- $n$ modulator means each responsive to a different one of said last $n$ binary digits and the next binary digit provided by said source for modulating a different one of said $n$ generators.

16. In a digital communication system for transmitting and receiving a sequence of binary digits provided by a data source;
- means for storing in order the last $p$ binary digits provided by said source;
- $n(n \leq p)$ generators each providing a unique signal; and
- $n$ modulator means each responsive to a unique combination of one or more of said last $p$ binary digits and the next binary digit provided by said source for modulating the signal provided by a different one of said $n$ generators.

17. The system of claim 16 including means for demodulating said signals comprising means for developing a sequence of $p$ reference binary digits;
- means for employing each of said $p$ reference binary digits to develop each of said unique combinations; and
- means responsive to each of said unique combinations and said modulated signals for ascertaining said next binary digit provided.

18. The system of claim 17 including means responsive to said ascertained next binary digit for developing said sequence of reference digits.

References Cited

UNITED STATES PATENTS

| | | | |
|---|---|---|---|
| 2,876,418 | 3/1959 | Villars | 332—11X |
| 3,381,271 | 4/1968 | Van Duuren | 178—50 |

ROBERT L. GRIFFIN, Primary Examiner

B. V. SAFOUREK, Assistant Examiner

U.S. Cl. X.R.

178—66; 325—40, 42; 340—351